(12) United States Patent
Saarinen et al.

(10) Patent No.: US 6,832,969 B2
(45) Date of Patent: Dec. 21, 2004

(54) HYDRAULIC POWER STEERING SYSTEM WITH RESERVOIR AND METHOD OF OPERATING SAME

(75) Inventors: John Saarinen, Washington, MI (US); David Huber, Blountville, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/839,914

(22) Filed: Apr. 20, 2001

(65) Prior Publication Data

US 2002/0155912 A1 Oct. 24, 2002

(51) Int. Cl.[7] .............................. B62D 11/06; B62D 5/06
(52) U.S. Cl. ........................................ 475/20; 180/417
(58) Field of Search ............................. 475/20, 22, 23, 475/24, 18, 30; 180/403, 417; 60/486, 456, 454; 184/6; 137/590

(56) References Cited

U.S. PATENT DOCUMENTS

| | | | | |
|---|---|---|---|---|
| 2,363,977 A | | 11/1944 | Kucher | |
| 3,434,282 A | * | 3/1969 | Shelhart | ...................... 60/405 |
| 3,822,765 A | * | 7/1974 | Heller et al. | .................. 180/6.7 |
| 3,861,241 A | * | 1/1975 | Hancock | ...................... 477/64 |
| 4,765,427 A | | 8/1988 | Yonker | |
| 4,794,883 A | * | 1/1989 | Fukami et al. | ........... 123/41.12 |
| 4,805,668 A | * | 2/1989 | Genter et al. | ................ 137/558 |
| 4,835,968 A | * | 6/1989 | Yamaguchi | ................... 60/422 |
| 5,477,882 A | * | 12/1995 | Duthie | ................... 137/565.19 |
| 5,557,977 A | * | 9/1996 | Stockton | .................... 74/15.84 |
| 6,416,370 B1 | * | 7/2002 | Bland et al. | .............. 440/61 R |

* cited by examiner

Primary Examiner—Tisha Lewis
(74) Attorney, Agent, or Firm—Tarolli, Sundheim, Covell & Tummino L.L.P.

(57) ABSTRACT

An apparatus (10) comprises a hydraulic fluid operated automatic transmission (20) for transmitting motive power from an engine (22) of a vehicle (16) to drive wheels (24) of the vehicle. The apparatus (10) also includes a hydraulic fluid power assisted steering gear (12) for effecting steering movement of steerable wheels (14) of the vehicle (16), the steering gear including a fluid motor (19). The apparatus (10) includes one body of hydraulic fluid (30) for operating both the transmission (20) and the steering gear (12), and one reservoir (32). A transmission pump (40) connected with the reservoir (32) pumps fluid (30) between the reservoir and the transmission (20). A power steering pump (34) connected with the reservoir (32) pumps fluid (30) between the reservoir and the motor (19). One of the pumps (40, 34) is operative to pump fluid (30) between the reservoir (32) and a cooler (50).

2 Claims, 2 Drawing Sheets

HYDRAULIC POWER STEERING SYSTEM WITH RESERVOIR AND METHOD OF OPERATING SAME

BACKGROUND OF THE INVENTION

1. Technical Field

The present invention relates to a reservoir for a hydraulic power steering system of a vehicle, and to a method of operating such a system.

2. Description of the Prior Art

A typical hydraulic power steering system for a vehicle, such as an automatic, includes a reservoir containing a body of power steering fluid. The power steering fluid is directed by a pump to a control valve and a hydraulic steering motor, upon rotation of the vehicle steering wheel, to effect steering movement of steerable wheels of the vehicle.

Many automobiles that have power assisted steering also have an automatic transmission. The automatic transmission includes a reservoir containing a body of automatic transmission fluid. The transmission fluid is pumped through the automatic transmission, by an integral pump, to operate the automatic transmission.

SUMMARY OF THE INVENTION

The present invention is an apparatus comprising a hydraulic fluid operated automatic transmission for transmitting motive power from an engine of a vehicle to drive wheels of the vehicle. The apparatus also includes a hydraulic fluid power assisted steering gear for effecting steering movement of steerable wheels of the vehicle, the steering gear including a fluid motor. The apparatus further includes a body of hydraulic fluid for operating both of the automatic transmission and the steering gear, and a reservoir for storing a portion of the hydraulic fluid. A transmission fluid pump is connected with the reservoir for pumping hydraulic fluid between the reservoir and the automatic transmission. A power steering pump is connected with the reservoir for pumping hydraulic fluid between the reservoir and the fluid motor. The apparatus also includes a cooler for cooling the hydraulic fluid, one of the power steering pump and the transmission fluid pump being operative to pump hydraulic fluid between the reservoir and the cooler.

The present invention is also a method comprising the steps of:

providing a body of hydraulic fluid;

operating with the hydraulic fluid an automatic transmission to transmit motive power from an engine of a vehicle to drive wheels of the vehicle;

operating with the hydraulic fluid a power assisted steering gear to effect steering movement of steerable wheels of the vehicle, the steering gear including a fluid motor;

storing in a reservoir a portion of the hydraulic fluid that is used for operating both the automatic transmission and the steering gear;

pumping hydraulic fluid between the reservoir and the automatic transmission and the fluid motor; and pumping hydraulic fluid between the reservoir and a cooler for cooling the hydraulic fluid.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
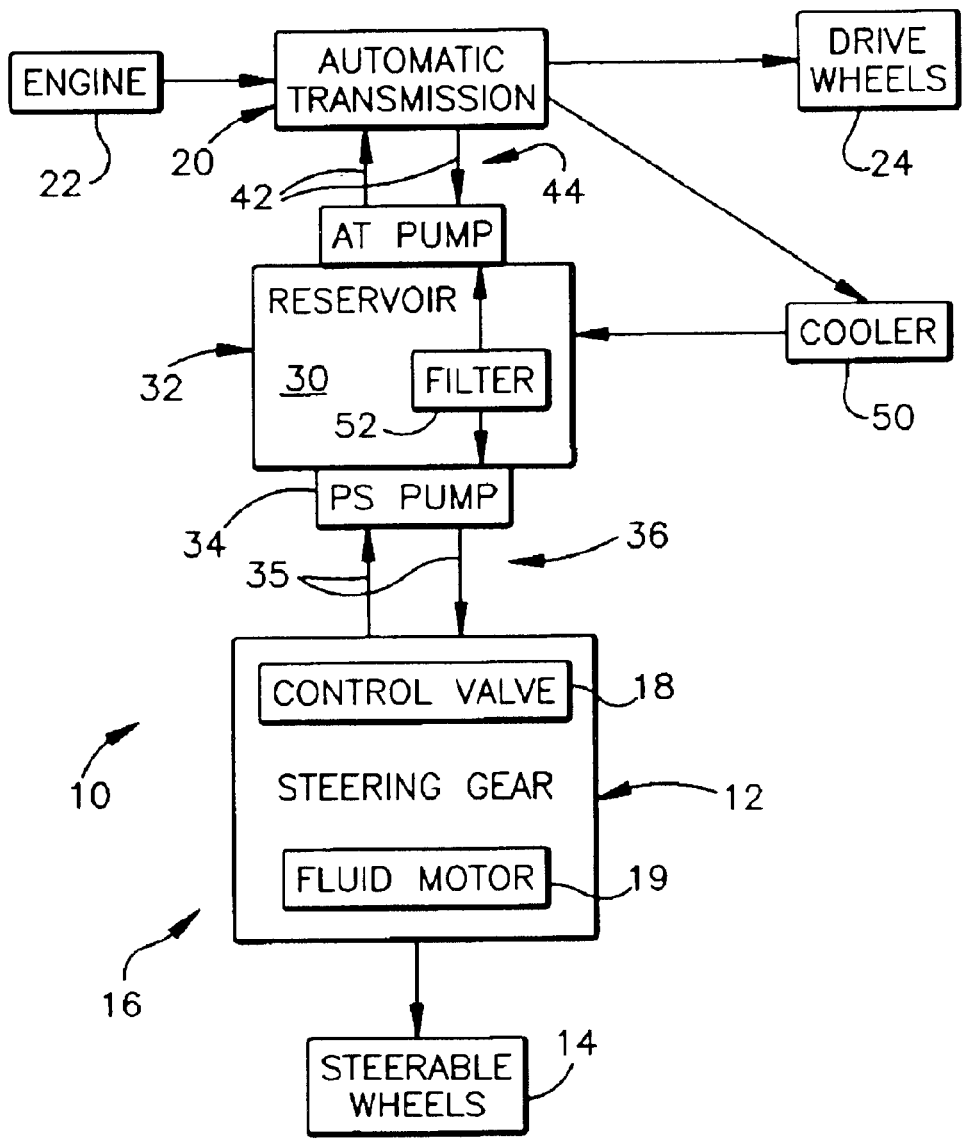
FIG. 1 is a block diagram of an apparatus in accordance with a first embodiment of the present invention including an automatic transmission and a power steering gear.

The present invention relates to a reservoir for a hydraulic power steering system of a vehicle, and to a method of operating such a system. The present invention is applicable to various power steering system configurations. As representative of the invention, FIG. 1 shows, in block diagram form, an apparatus 10 in accordance with a first embodiment of the invention.

The apparatus 10 includes a hydraulic fluid power assisted steering gear 12 for effecting steering movement of steerable wheels 14 of a vehicle 16. The steering gear 12 is of a known type that includes a control valve 18 and a fluid motor 19 which, in response to the application of fluid under pressure, moves a movable member to effect steering movement of the steerable wheels 14 of the vehicle 16. The steering gear 12 may be, for example, a rack and pinion steering gear.

The apparatus 10 also includes an automatic transmission 20 for transmitting motive power from an engine 22 of the vehicle 16 to drive wheels 24 of the vehicle. The automatic transmission 20 is a known device that operates on hydraulic automatic transmission fluid. The hydraulic fluid flows in two primary circuits in the automatic transmission 20: first, a control circuit that operates valves, servos and accumulators, and second, a relatively free-flowing circuit that cools, lubricates and couples the engine 22 to the transmission through a torque converter.

The apparatus 10 includes a single body of hydraulic fluid 30 for operating both of the automatic transmission 20 and the steering gear 12. A portion of the hydraulic fluid 30 is stored in a reservoir 32. The reservoir 32 is in common between the automatic transmission 20 and the power steering gear 12.

A power steering pump 34 is connected with the reservoir 32 for pumping hydraulic fluid between the reservoir and the fluid motor 19. The apparatus 10 includes a plurality of power steering fluid lines 35. The power steering fluid lines 35 form a portion of a fluid flow path 36 of the hydraulic fluid 30 for operating the steering gear 12. The lines 35 interconnect and transmit hydraulic fluid 30 between the power steering pump 34 and the steering gear 12. The power steering pump 34 is illustrated as being integral with the reservoir 32. The power steering pump 34 could, alternatively, be connected with the reservoir 32 by separate fluid lines (not shown).

A transmission fluid pump 40 is connected with the reservoir 32 for pumping hydraulic fluid 30 between the reservoir and the automatic transmission 20. The apparatus 10 includes a plurality of automatic transmission fluid lines indicated schematically at 42. The automatic transmission fluid lines 42 form a portion of a fluid flow path 44 of the hydraulic fluid 30 for operating the automatic transmission 20. The lines 42 interconnect and transmit fluid between the automatic transmission pump 40 and the internal parts of the automatic transmission 20. The automatic transmission pump 40 is illustrated as being integral with the reservoir 32. The automatic transmission pump 40 could, alternatively, be connected with the reservoir 32 by separate fluid lines (not shown).

The reservoir 32 is in common between the flow path 44 of the hydraulic fluid 30 for operating the automatic transmission 20 and the flow path 36 of the hydraulic fluid 30 for operating the power steering gear 12. As a result, the flow path 44 of the hydraulic fluid 30 for operating the automatic transmission 20 is connected in fluid communication with the flow path 36 of the hydraulic fluid 30 for operating the power steering gear 12. Both flow paths 36 and 44 use the same body 30 of hydraulic fluid.

The apparatus 10 also includes a cooler 50. The cooler 50 is a known device operative to cool the hydraulic fluid 30, such as a known automatic transmission fluid cooler. In the illustrated embodiment, the automatic transmission pump 40 is operative to pump hydraulic fluid 30 from the transmission 20 to the cooler 50 and thence back to the reservoir 32. In another embodiment, the power steering pump 34 could pump hydraulic fluid 30 to and from the cooler 50.

The apparatus 10 also includes a filter 52. The filter 52 is a known device operative to filter the hydraulic fluid 30, such as a known automatic transmission fluid filter. The filter 52 is preferably located in or adjacent to the reservoir 32. The filter 52 filters both the fluid 30 flowing to the automatic transmission 20 and the fluid 30 flowing to the power steering gear 12.

The present invention has the advantage of providing only one fluid reservoir 32 that serves both the automatic transmission system of the vehicle 16 and the power steering system of the vehicle. This is possible because both systems operate with the same type of hydraulic fluid 30. By using the automatic transmission reservoir 32 and fluid 30 for the power steering system, the present invention eliminates the need for a separate power steering reservoir, and also uses the transmission cooler 50 to cool the power steering fluid. In addition, fluid in an automatic transmission typically warms up more quickly than power steering fluid. Using this warmer fluid in the power steering pump 34 can help to reduce noise in the power steering pump in cold starts. In addition, the filter that is typically found in an automatic transmission can help filter the power steering fluid.

Figure 2:
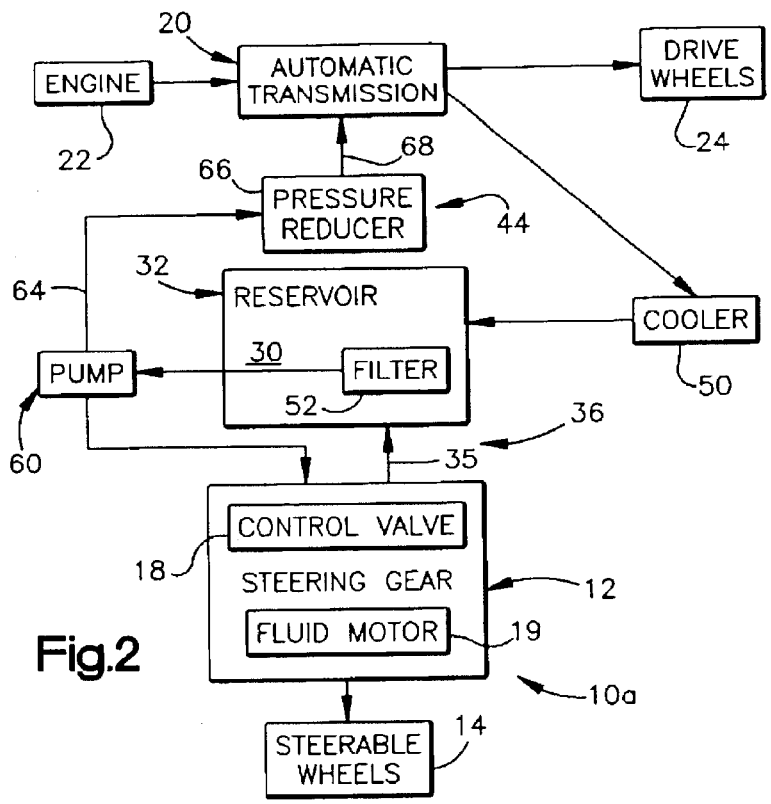
FIG. 2 is a block diagram similar to FIG. 1 of an apparatus in accordance with a second embodiment of the invention.

FIG. 2 shows in block diagram form an apparatus 10a in accordance with a second embodiment of the invention. Parts of the apparatus 10 that are replicated in the apparatus 10a are given the same reference numeral with the suffix "a" attached.

In the apparatus 10a, one pump 60 is used for both the automatic transmission 20 and the power steering gear 12. The single pump 60 can be used even though the automatic transmission 20 operates on a lower fluid pressure than is required by the power steering gear 12.

Specifically, fluid from the reservoir 30 flows through the filter 52 to the pump 60. The pump 60 outputs fluid at a relatively high pressure of 1,000 to 1,750 psi, or whatever level is required by the power steering gear 12. A first portion of this relatively high pressure fluid is directed through a fluid line 62 to the power steering gear 12. A second portion of this relatively high pressure fluid is directed through another fluid line 64 to a pressure reducer 66. The pressure reducer 66 reduces the pressure of the fluid in the line 64 to a pressure that is suitable for use in the automatic transmission 20. This relatively low pressure fluid is directed through a fluid line 68 to the automatic transmission 20.

Figure 3:
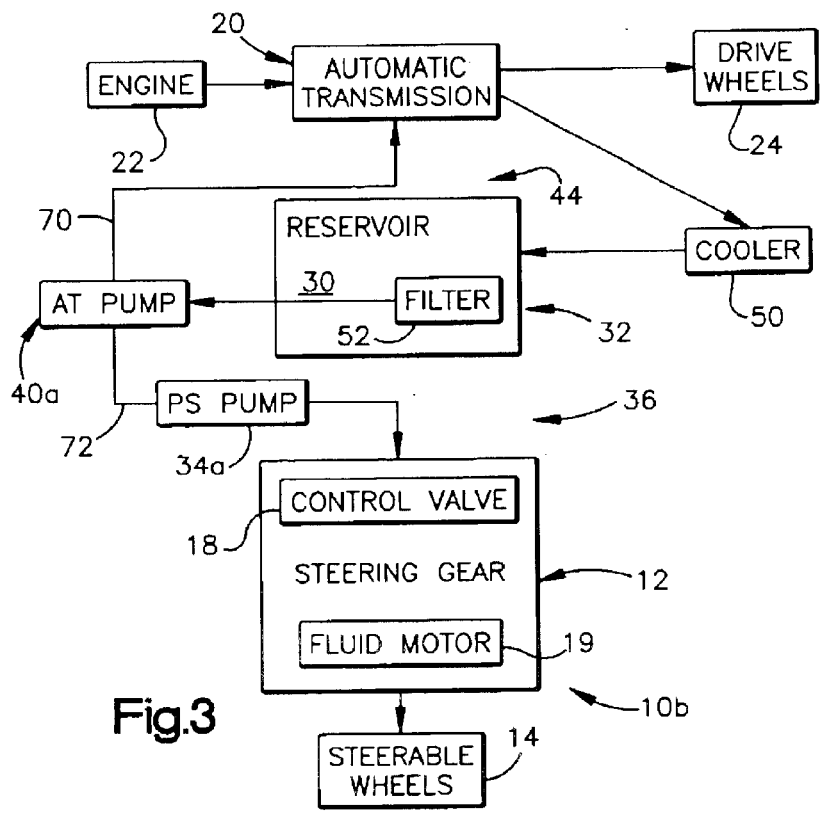
FIG. 3 is a block diagram similar to FIG. 1 of an apparatus in accordance with a third embodiment of the invention.

FIG. 3 shows in block diagram form an apparatus 10b in accordance with a third embodiment of the invention. Parts of the apparatus 10 that are replicated in the apparatus 10b are given the same reference numeral with the suffix "b" attached.

In the apparatus 10b, the transmission pump 40a is used to prime the power steering pump 34a. Specifically, fluid 30 from the reservoir 32 flows through the filter 52 to the transmission pump 40a. The transmission pump 40a outputs fluid at relatively low pressure as required by the automatic transmission 20. A first portion of this relatively low pressure fluid is directed through a fluid line 70 to the automatic transmission 20. A second portion of this relatively low pressure fluid is directed through a fluid line 72 to the power steering pump 34a. The power steering pump 34a increases the pressure of the fluid in the line 72 to a pressure that is suitable for use in the power steering gear 12. This relatively high pressure fluid is directed through another fluid line 74 to the power steering gear 12.

From the foregoing description of the invention, those skilled in the art will perceive improvements, changes and modifications in the invention. Such improvements, changes and modifications within the skill of the art are intended to be covered by the appended claims.

Having described the invention, We claim:

1. An apparatus comprising:

a hydraulic fluid operated automatic transmission for transmitting motive power from an engine of a vehicle to drive wheels of the vehicle;

a hydraulic fluid power assisted steering gear for effecting steering movement of steerable wheels of the vehicle, said steering gear including a fluid motor;

a body of hydraulic fluid for operating both of said automatic transmission and said steering gear;

a reservoir for storing a portion of said hydraulic fluid;

a transmission fluid pump connected with said reservoir, a first fluid conduit for conducting hydraulic fluid from said reservoir to said automatic transmission at a relatively low pressure and a second fluid conduit for conducting hydraulic fluid from said automatic transmission to said reservoir;

a power steering pump connected with said reservoir, said power steering pump being spaced apart from said transmission fluid pump, a third fluid conduit for conducting hydraulic fluid from said reservoir to said fluid motor at a relatively high pressure and a fourth fluid conduit for conducting hydraulic fluid from said fluid motor to said reservoir; and a cooler for cooling said hydraulic fluid, said transmission fluid pump being operative to pump some hydraulic fluid from said automatic transmission through a fifth conduit to said cooler and from said cooler through a sixth conduit to said reservoir, said power steering pump pumping fluid that flowed through said automatic transmission to said fluid motor.

2. The apparatus as set forth in claim 1 comprising a filter for filtering said hydraulic fluid, said filter filtering said hydraulic fluid between said reservoir and said transmission fluid pump, said filter further filtering said hydraulic fluid between said reservoir and said power steering pump.

* * * * *